United States Patent
Nachum

(10) Patent No.: US 9,806,907 B2
(45) Date of Patent: Oct. 31, 2017

(54) METHODS AND APPARATUSES FOR IMPLEMENTING NETWORK PACKET BROKERS AND TAPS

(71) Applicant: Ixia, Calabasas, CA (US)

(72) Inventor: Youval Nachum, Holon (IL)

(73) Assignee: IXIA, Calabasas, CA (US)

( * ) Notice: Subject to any disclaimer, the term of this patent is extended or adjusted under 35 U.S.C. 154(b) by 0 days.

(21) Appl. No.: 14/266,666

(22) Filed: Apr. 30, 2014

(65) Prior Publication Data

US 2015/0319098 A1    Nov. 5, 2015

(51) Int. Cl.
*H04L 12/26* (2006.01)
*H04L 12/64* (2006.01)

(52) U.S. Cl.
CPC .......... *H04L 12/6418* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 8,248,928 B1* | 8/2012 | Wang .................... | H04L 43/026 370/230 |
| 2002/0049841 A1* | 4/2002 | Johnson .................. | H04L 67/10 709/225 |
| 2002/0097733 A1* | 7/2002 | Yamamoto .............. | H04L 45/00 370/412 |
| 2003/0135612 A1 | 7/2003 | Huntington et al. | |
| 2007/0041364 A1* | 2/2007 | Kakadia .................. | H04L 45/00 370/352 |
| 2007/0230486 A1 | 10/2007 | Zafirov | |
| 2009/0290501 A1 | 11/2009 | Levy et al. | |
| 2011/0202696 A1* | 8/2011 | Kitahara ........... | G06F 15/17337 710/33 |
| 2012/0058777 A1* | 3/2012 | Nguyen ................ | H04W 24/02 455/456.1 |
| 2013/0227689 A1 | 8/2013 | Pietrowicz et al. | |
| 2013/0250777 A1* | 9/2013 | Ziegler .................. | H04L 43/10 370/248 |
| 2013/0347103 A1 | 12/2013 | Veteikis et al. | |
| 2014/0171089 A1 | 6/2014 | Janakiraman et al. | |
| 2017/0041199 A1 | 2/2017 | Rhodes | |

OTHER PUBLICATIONS

"Network Taps," Net Optics, Inc., p. 1-5 http://web.archive.org/web/20130202072753/http://www.netoptics.com/products/networktaps? (Jan. 27, 2016).

"What is a Wifi Network Analyzer," Wireshark, https://web.archive.org/web/20140801025323/http://wireshark.com/, p. 1-3 (Aug. 1, 2014).

Non-Final Office Action for U.S. Appl. No. 14/475,511 (dated Mar. 31, 2017).

* cited by examiner

*Primary Examiner* — Michael J Moore, Jr.
*Assistant Examiner* — Ayanah George
(74) *Attorney, Agent, or Firm* — Jenkins, Wilson, Taylor & Hunt, P.A.

(57) ABSTRACT

Arrangements and methods for improving data communication in a network are disclosed. The method includes receiving data packets and segregating the data packets into at least original packets and replicated packets. The method also includes prioritizing original packets having service level agreement (SLA) requirements, the prioritizing is performed with respect to at least one of queuing and de-queuing such that SL parameters for the original packets met.

20 Claims, 5 Drawing Sheets

METHODS AND APPARATUSES FOR IMPLEMENTING NETWORK PACKET BROKERS AND TAPS

BACKGROUND OF THE INVENTION

The present invention relates to methods and apparatuses for improving network traffic in a networked environment. More particularly, the present invention relates, in one or more embodiments, to improvements in Network Packet Brokers and taps and in their implementations.

Network Packet Brokers ("NPB") and network taps ("taps") have long been incorporated into networks (such as internal networks and/or the internet) to facilitate processing of data packets and/or to route data packets to/from network monitoring tools. These monitoring tools may include, for example, network analysis tools, forensic tools, various network monitoring tools, firewalls, malware prevention tools, intrusion detection tools, etc.

Generally speaking, taps are implemented at specific points in the network to access the data traffic and pass the data (whether the original data packets or the replicated copies thereof) to the monitoring tools. NPBs, on the other hand, represent hardware and/or software modules that perform, among other tasks, aggregation of monitored traffic (which again can be the original data packets or replicated copies thereof) from multiple links/segments, filtering and grooming of traffic to relieve overburdened monitoring tools, load-balancing traffic across a pool of monitoring tools, and regeneration of traffic to multiple monitoring tools. Both taps and NPBs are available from vendors such as Ixia Corporation of Calabasas, Calif.

To facilitate discussion, FIG. 1 shows a typical network configuration in which a plurality of network devices (such as routers or switches) 102A, 102B, 102C, 102D, 102E, 102F and 102G are shown communicatively coupled to NPB 104. The couplings between network devices 102A-102C with NPB 104 are accomplished using respective mirroring ports 106A-106C such as a SPAN or Switch Port Analyzer ports in the terminology of vendor Cisco Corporation of San Jose, Calif.) on the network devices. Data packets traversing each of NDs 102A-102C may be replicated and provided to respective mirroring ports, which packets are then provided on respective links 108A-108C to respective ingress ports (not shown) of NPB 104. In this configuration, NPB 104 is said to be connected in an out-of-band configuration with respect to packets traversing NDs 102A-102C since the original packets continue on their way without traversing NPB 104 while NPB 104 receives the replicated packets from NDs 102A-102C for forwarding to one or more of the monitoring tools 122 and 124.

Packets traversing between ND 102D and ND 102E can be tapped by tap 110, which is coupled to both NDs 102D and 102E. In one example, the packets from NDs 102D and 102E may be duplicated by tap 110 and provided to NPB 104 via links 108D and 108E respectively. In this configuration, NPB 104 is said to be connected in an out-of-band configuration with respect to packets traversing NDs 102D and 102E since the original packets continue on their way without traversing NPB 104 while NPB 404 receives the replicated packets from NDs 102D-102E.

In another example, the packets from ND 102D may be intercepted by tap 108 and redirected by tap 108 to NPB 104 and from NPB 104 to one or more of the monitoring tools for further forwarding to an analysis tool (such as analyzer 120) before being routed to ND 102E if the result of the analysis indicates that such routing is permissible. Malware detection may be one such type of analysis. In this configuration, NPB 104 is said to be connected in an in-line configuration since NPB 104 is in the data path between ND 102D and ND 102E and packets must traverse NPB 104 before reaching the destination.

FIG. 1 also shows a port aggregator 126, which aggregates packet traffic from NDs 102F and 102G to provide the aggregated packets to NPB 104 via link 124. Again, NPB 104 can be connected in-line with respect to the communication between NDs 102F and 102G (i.e., NPB 104 can be in the network data path), or NPB 104 can be connected in an out-of-band manner with respect to the communication between NDs 402F and 102G (i.e., NPB 104 receives only the replicated packets and the original packets continue on their way without traversing NPB 104).

As is well known, certain types of communication require a certain level of Service Level Agreement (SLA) with respect to, for example, delay and/or jitter and/or packet drop rate and the like. These SLAs may be agreed upon between the users and the network operator, for example. For certain types of communication, such as voice or video for example, the jitter parameter must be tightly controlled as packets traverse the network from the origination point to the destination point in order to ensure a high quality session. As another example, financial data packets (such as buy/sell orders) often require as little delay as possible. As yet another example, backup data packets may not tolerate any packet loss while a videoconferencing session may suffer some packet loss without undue detrimental results. These packet transmission specifications for packets associated with a given communication session may be accommodated using an appropriate SLA.

Although NPBs and taps are currently part of the network and are disposed in the communication paths thereof, little attention has been paid to ensure that their involvement does not detrimentally affect the required SLA of the packets involved.

Further, even if SLAs are not involved, the monitoring tools to which the NPBs forward the packets may have certain capabilities and/or requirements. Currently, little attention has been paid to ensure that packets are forwarded by the NPBs to the tools comply with these tool capabilities and/or requirements. Likewise, the network may have certain capabilities and/or requirements for the forwarding of the packets by the NPBs. These requirements need to be observed if the NPBs are to be truly integrated into the network.

For these reasons and others, improvements in NPBs and taps and in their implementations are desired.

SUMMARY OF SOME EMBODIMENTS OF THE INVENTION

The invention relates, in an embodiment, to a method for improving data communication in a network. The method includes receiving data packets. The method also includes segregating the data packets into at least original packets and replicated packets. The method further includes prioritizing the original packets if the original packets have service level agreement (SLA) requirements. The prioritizing is performed with respect to at least one of queuing and de-queuing such that SL parameters for the original packets met.

In another embodiment, the invention relates to an arrangement for improving data communication in a network. The arrangement includes a first port for receiving data packets. The arrangement also includes logic for segregating the data packets into at least original packets and replicated packets. The method further includes logic for prioritizing the original packets if the original packets have service level agreement (SLA) requirements. The prioritizing is performed with respect to at least one of queuing and de-queuing such that SLA parameters for the original packets met.

In yet another embodiment, the invention relates to a network packet broker for facilitating monitoring of network traffic in a data communication in a network. The method includes a first port for receiving data packets. The method also includes logic for segregating the data packets into at least original packets and replicated packets. The method further includes logic for prioritizing the original packets if the original packets have service level agreement (SLA) requirements, the prioritizing is performed with respect to at least one of queuing and de-queuing such that SLA parameters for the original packets met.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
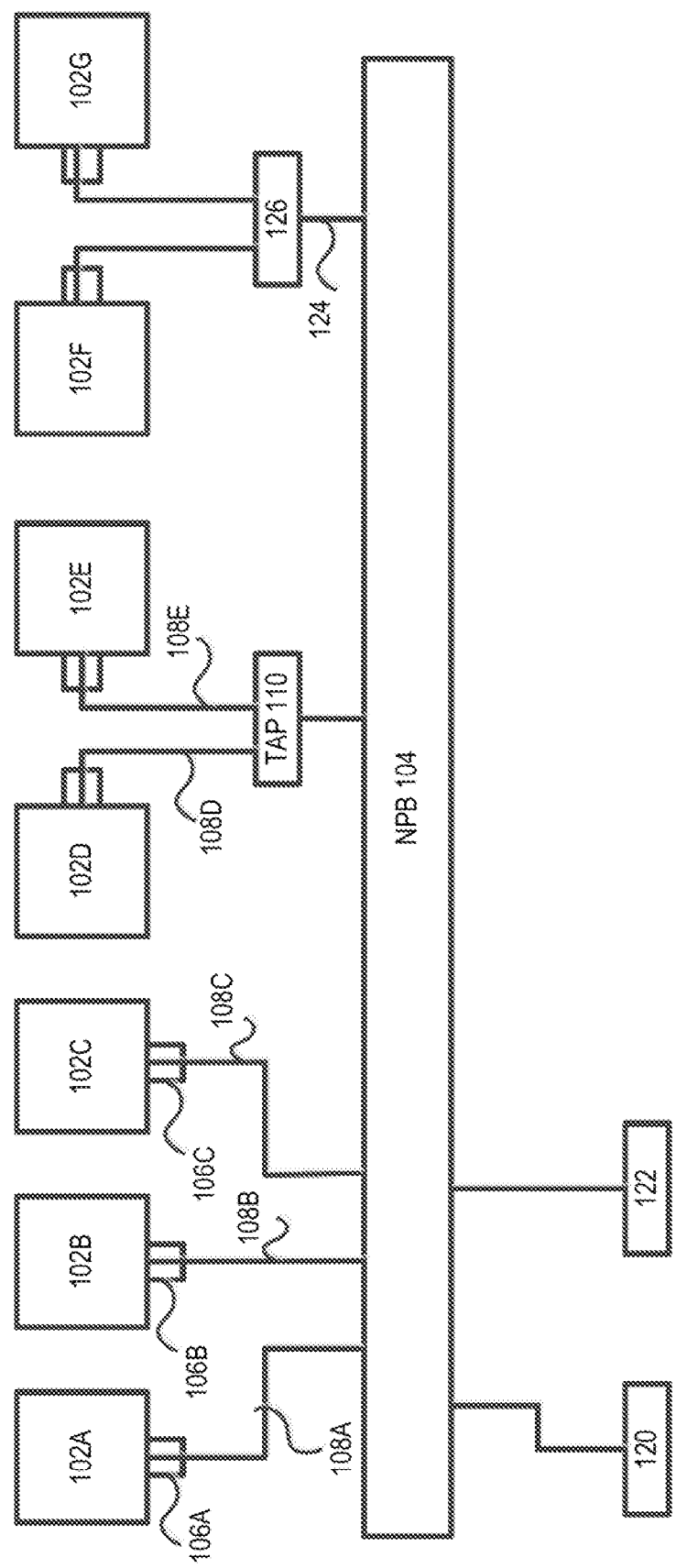
FIG. 1 shows a typical network configuration in which a plurality of network devices (such as routers or switches) are shown communicatively coupled to a NPB to facilitate discussion.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the invention relate to methods and apparatus for improving data communication in a network that employs NPBs and/or taps. More particularly, one or more embodiments of the invention relate to methods and apparatuses in the NPBs for segregating the received packets into original and replicated data packets, for implementing traffic management in the NPBs and/or taps for SLA packets that require SLAs such that the SLA parameters are met, and for managing traffic in accordance with the requirements and/or capabilities of the monitoring tools and/or the network.

In one or more embodiments, each packet to be handled by the NPB is segregated by the NPB and marked by the NPB with an indication that reflects whether the packet is the original packet or a replicated packet. Segregation can be done, in one or more embodiments, by for example determining which ingress port of the NPB receives the packets since an ingress port may be associated with a specific tap that egresses replicated packets (replicated by the tap, for example) to that NPB ingress port. In this case, those packets received at ingress ports known to be configured to receive replicated packets from specific taps are designated replicated packets and marked as such. Alternatively or additionally, in one or more embodiments, the header and/or content of the packet can be inspected to classify the packet as either original or replicated if desired.

The marking can be accomplished by the NPB by setting to value in a chosen header field (which may be an existing unused field or as new field added to the header by the device that does the marking) or by adding to the packet content information that provides such indication.

To clarify, a packet is said to be an original packet if it is the packet sent by the sender and destined for the receiver. A packet is said to be a replicated packet if it is replicated by a device in the network, such as the tap or NPB, for monitoring purposes for example. If the packet is marked as an original packet and is further associated with a given SLA parameter, the NPB prioritizes the enqueueing and dequeing such that the SLA requirements are met (using techniques such as shaping, buffering, load balancing, scheduling, different priority queues, etc.). For example, these original SLA packets may be scheduled for enqueing in special or specifically designated priority queues that are different from other queues in the NPB and dequeued with a higher priority to the egress port of the NPB in order to meet the SLA requirements.

On the other hand, if the marking indicates the packets to be for example replicated packets (such as in an example replicated packets to be sent to the monitoring tools), the NPB enqueues and dequeues (using techniques such as shaping, buffering, load balancing, scheduling, different priority queues, etc.) these packets such that the capabilities and/or requirements of the monitoring tools and/or the network are observed.

These capabilities and/or requirements of the tools and/or network may specify the types of packets that can be received by a given monitoring tool, the drop rate, the receive bandwidth, the tool processing rate, the maximum delay, etc. In an embodiment, packets marked with an indication that reflects that they are replicated packets are enqueued and dequeued by the NPB with a priority lower than those packets with SLAs (such as the original and SLA-enabled packets mentioned earlier) but in compliance with the capabilities and requirements of the monitoring tools and/or networks.

In one or more embodiments, the NPB may receive explicit parameters regarding the aforementioned capabilities and/or requirements from the monitoring tools and/or network. In other embodiments, the NPB may ascertain certain parameters regarding the aforementioned capabilities and/or requirements of the monitoring tools and/or network from flow control parameters (e.g., if a link or port is backed up, that fact provides, for example, an indication of the processing capability of the monitoring tool on that link or an indication of the bandwidth on that network link).

As implied by the above, NPBs of the present invention support accumulation in multiple queues of different priorities and implement different enqueing and dequeing strategies for different packets. In so doing, SLAs for packets that are associated with SLAs are maintained by according a higher priority for processing/transmitting these packets in the NPB) and packets that do not require compliance with SLA parameters may be prioritized lower albeit still following the requirements and/or limitations of the monitoring tools and/or of the network.

This is markedly different from the prior art wherein all packets are treated more or less equally by the NPB and there is no segregation of original versus replicated packets. In that case, congestion at the monitoring tools can cause output queues to overflow, which detrimentally affects the bandwidth of original SLA packets, for example, or may cause packets to be undesirably dropped. As another example, when all packets are processed at the same priority by the NPB, the fact that the NPB processes the replicated packets with the same priority as the SLA packets means that there may be times when the replicated packets are processed faster than required, and there may not be enough leftover processing and/or transmitting bandwidth to comply with SLA parameters for the SLA packets. This is particularly true for high speed communication.

These and other features and advantages of the invention may be better understood with reference to the figures and discussions that follow.

Figure 2:
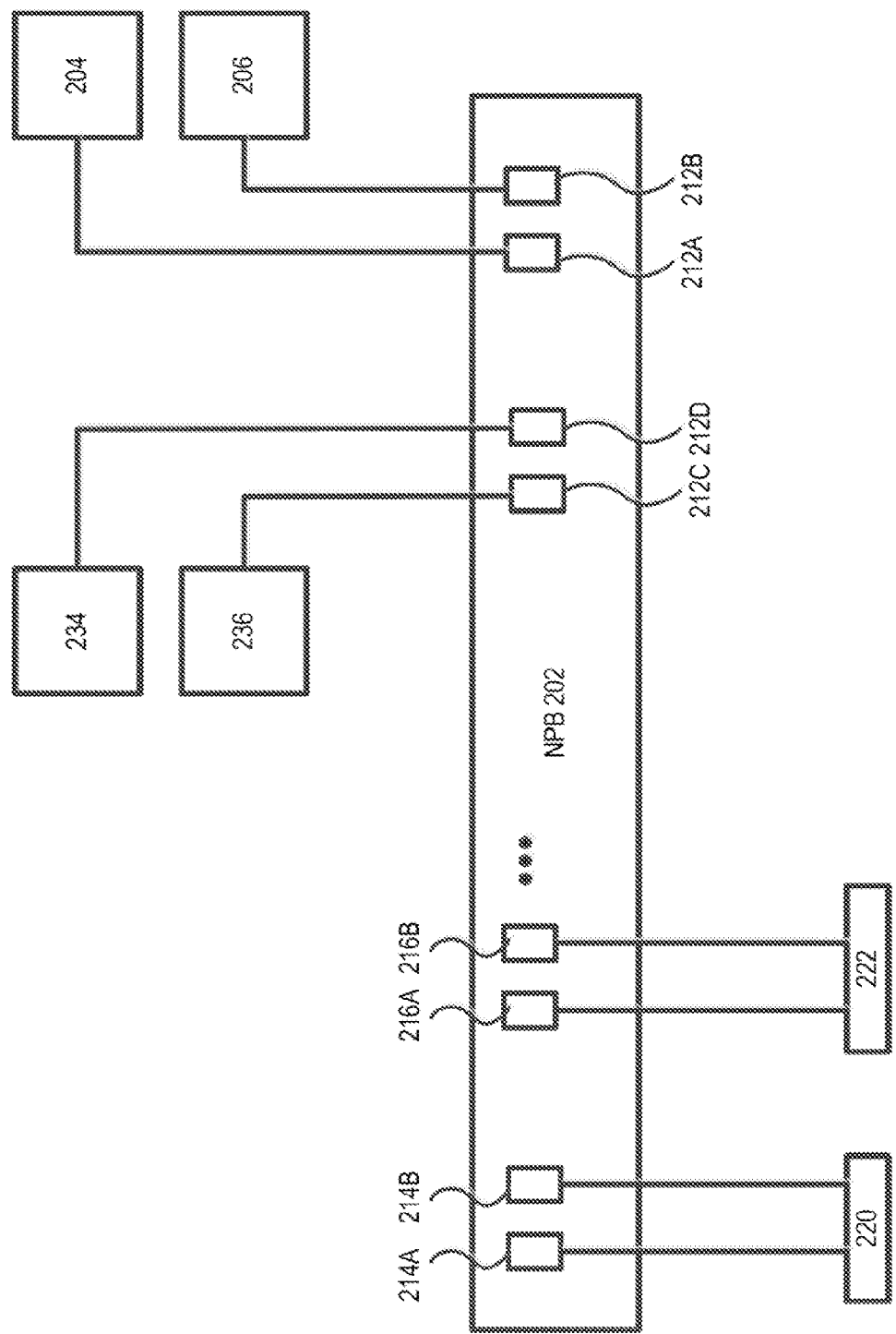
FIG. 2 shows in accordance with an embodiment an example NPB arrangement that involves original and/or replicated packets to facilitate discussion.

FIG. 2 shows in accordance with an embodiment an example NPB arrangement that involves original and/or replicated packets to facilitate discussion. In FIG. 2, NPB 202 receives packets from devices 204 and 206, which may be taps in this example but may also be switches and/or routers.

In the first example, packets from device 204 may be processed such that original packets are ingressed at NPB port 212A and egressed out of NPB port 214A toward monitoring tool 220. After monitoring tool 220 performs monitoring on the original packets received from NPB port 214A, monitoring tool 220 may send the original packets to NPB port 214B to be sent by NPB 202 to device 206 via NPB port 212B. In this example, NPB 202 is said to be in-line for the original packets since the NPB 202 is disposed in the data path of the original packets.

Further, NPB 202 in this first example may replicate the original packets received at port 212A and send the replicated packets to monitoring tool 222 via NPB port 216A. After monitoring, monitoring tool 222 may send the result back via NPB port 216B to NPB 202 for further action, for example. In this configuration NPB 202 is said to be out-of-band for the replicated packets since NPB 202 is not disposed in the network data path between the sender and the receiver when it receives and processes the replicated packets.

In this first example, embodiments of the invention segregate the ingressed packets and the packets may be marked as either "original" or "replicated". Embodiments of the invention also support multiple queues within the NPB with different priorities such that the original packets, if associated with an SLA, will be processed with appropriate priorities with respect to processing, enqueueing priorities and dequeueing schedules to ensure the SLA parameters are met. The replicated packets may be processed with due priorities to ensure that such processing by the NPB does not negatively impact the SLA of the SLA packets while being in compliance with the capabilities and requirements of the monitoring tools and/or network.

Other examples are possible with the arrangement of FIG. 2. In the second example the original packets between devices 234 and 236 (which may be switches or routers or taps) may ingress at respective ports 212C and 212D and by-pass both monitoring tools 220 and 222, and NPB 202 simply acts as a flow-through device for these original packets (via NPB ports 212A and 212B). If these packets are associated with SLAs, they will be marked, enqueued and dequeued with appropriate priorities to ensure the SLA parameters are met.

In the third example, packets between devices 204 and 206 may be replicated such that one or both monitoring tools 220 and 222 may receive replicated packets (replicated packets may be sent to multiple different monitoring tools for different monitoring purposes, for example, or may be sent to multiple different monitoring tools to implement load balancing) while the original packets flow through NPB 202. In this example, the replicated and original packets are segregated and marked accordingly. Further, they are enqueued and dequeued with appropriate priorities to ensure the SLA parameters are met for the SLA packets and to ensure that the packets sent to the monitoring tools are in compliance with the capabilities and/or requirements of the monitoring tools and/or the network.

In the fourth example, packets from both devices 204 and 206 may represent replicated packets (such as those received from mirroring ports (e.g., SPAN ports) of switches or routers or from taps) and may be aggregated by NPB 202 (after segregation and marking) for processing by monitoring tool 220. The processing may be performed in compliance with the capabilities and/or requirements of the monitoring tools and/or the network. The original packets may (after segregation and marking) be processed as if NPB 202 is a flow-through device for the original packets. Alternatively, the original packets may be processed by monitoring device 222, and NPB 202 processes these original packets with appropriate priorities such that SLA parameters are met if these original packets are associated with SLA parameters.

Figure 3:
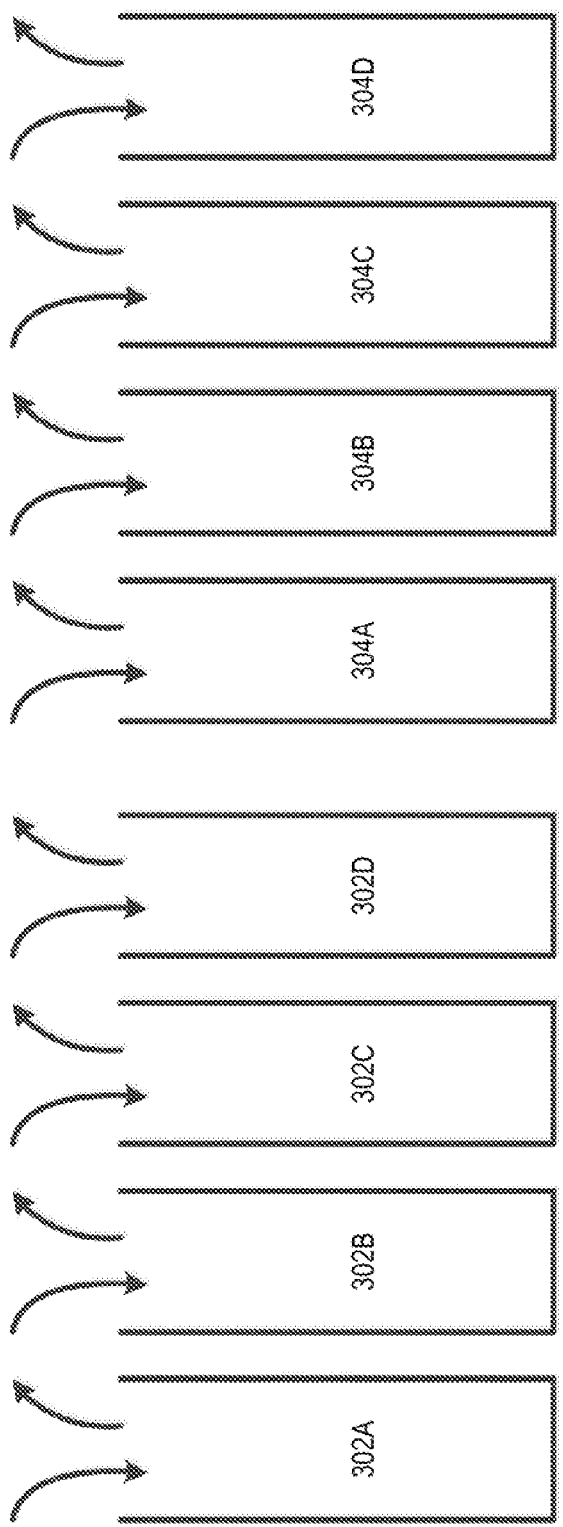
FIG. 3 shows some example queues for use with SLA packets and packets destined for monitoring tools.

In one or more embodiments, groups of queues may be implemented for different priorities. For example, SLA packets flow different NPB ingress ports may be enqueued and accumulated in a group of high priority queues. An appropriate scheduling mechanism such as strict priority, for example, may be employed to dequeue these high priority queues for outputting SLA packets via the NPB egress ports. FIG. 3 shows queues 302A-302D being high priority queues for accumulating the SLA packets.

The packets with lower priority for processing (such as replicated packets destined for the monitoring tools) may be enqueued and accumulated in a group of lower priority queues. An appropriate scheduling mechanism such as weighted round robin, for example, may be employed to dequeue these low priority queues for outputting these packets to the monitoring tools via the NPB egress ports. FIG. 3 shows queues 304A-304D being lower priority queues for accumulating the lower priority packets.

Although only two groups of queues are shown, additional groups may be employed to implement different priorities and/or enqueing/dequeueing schemes. Further, the number of queues in each group may vary as desired. Still further and as an important distinction of some embodiments of the invention, load balancing may be performed by the NPB (using, for example, flow control parameters) among the queues.

One or more embodiments support NPB stacking, while providing SLA maintenance and traffic management in compliance with the requirements and/or capabilities of the tools/networks. In one or more embodiments, the egress port of one NPB may be coupled to the ingress port of another NPB such that a packet may traverse multiple NPBs in the path from a device (such as a switch, a router, or a tap) to a monitoring tool or from the destination device to the target device.

In one or more embodiments, only the first NPB of the multi-NPB stack that encounters the packet needs to perform segregation and marking. Other NPBs may employ the markings already done on the packets for SLA maintenance and traffic management purposes (to comply with SLA and/or the requirements and/or capabilities of the tools/networks). In other embodiments, all NPBs may perform their own segregation and/or marking as necessary.

In one or more embodiments, load balancing may be performed by the NPB among queues in the same priority group in order to avoid overstressing any particular queue.

Figure 4:
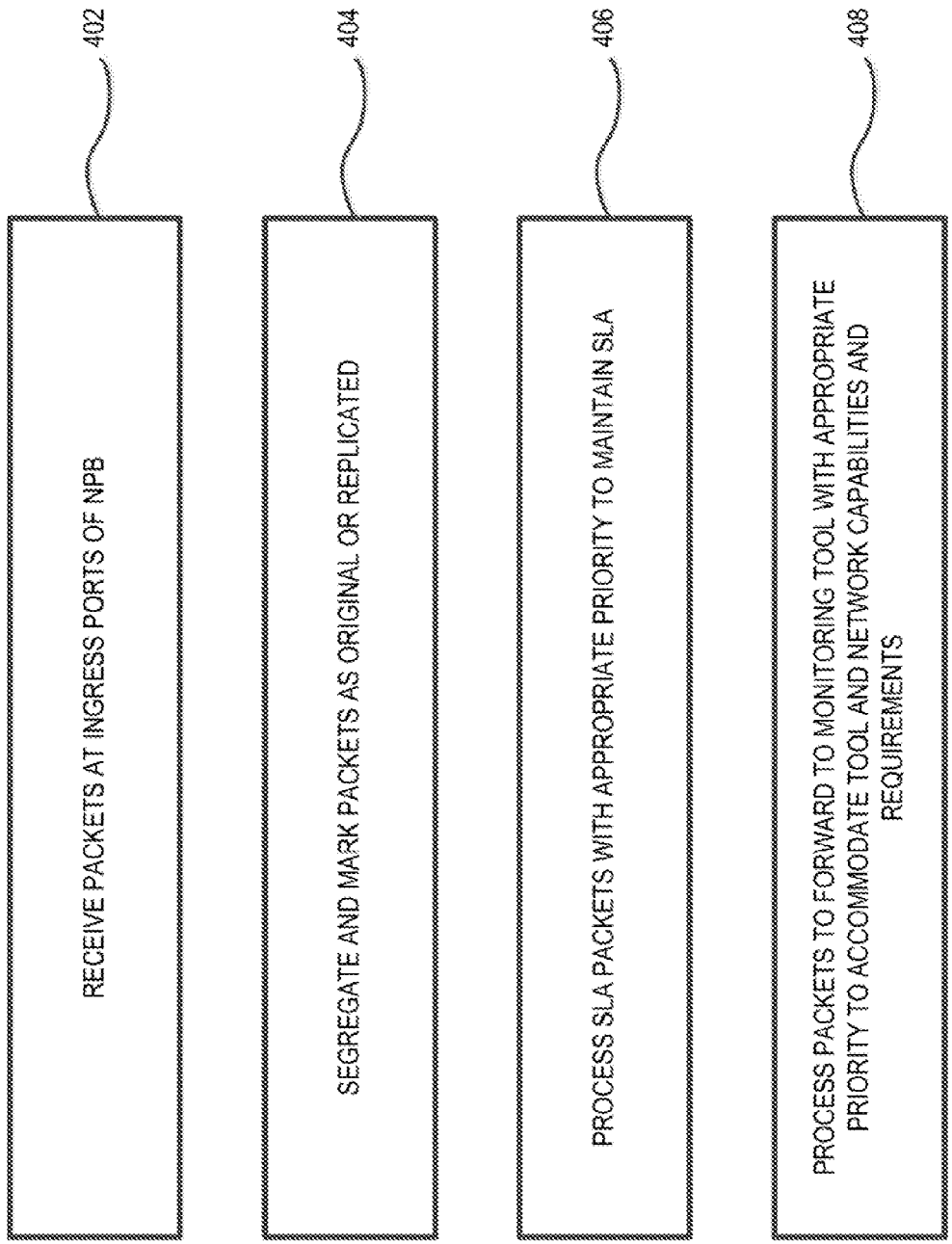
FIG. 4 shows, in an example, the method steps for implementing SLA maintenance and traffic management (e.g., to comply with the requirements and/or capabilities of the tools/networks) in NPBs.

FIG. 4 shows, in an example, the method steps for implementing SLA maintenance and traffic management (e.g., to comply with the requirements and/or capabilities of the tools/networks) in NPBs. In step 402, the packets are received at the ingress ports of the NPB. In step 404, the packets are segregated, if needed, into original and replicated packets and marked accordingly. In step 406, packets are processed with appropriate priorities such that SLA packets are processed in a manner so as to preserve SLA requirements. In step 408, packets that do not have SLA requirements and are destined for the monitoring tools are processed in a manner that complies with the requirements and/or capabilities of the tools/networks.

Figure 5:
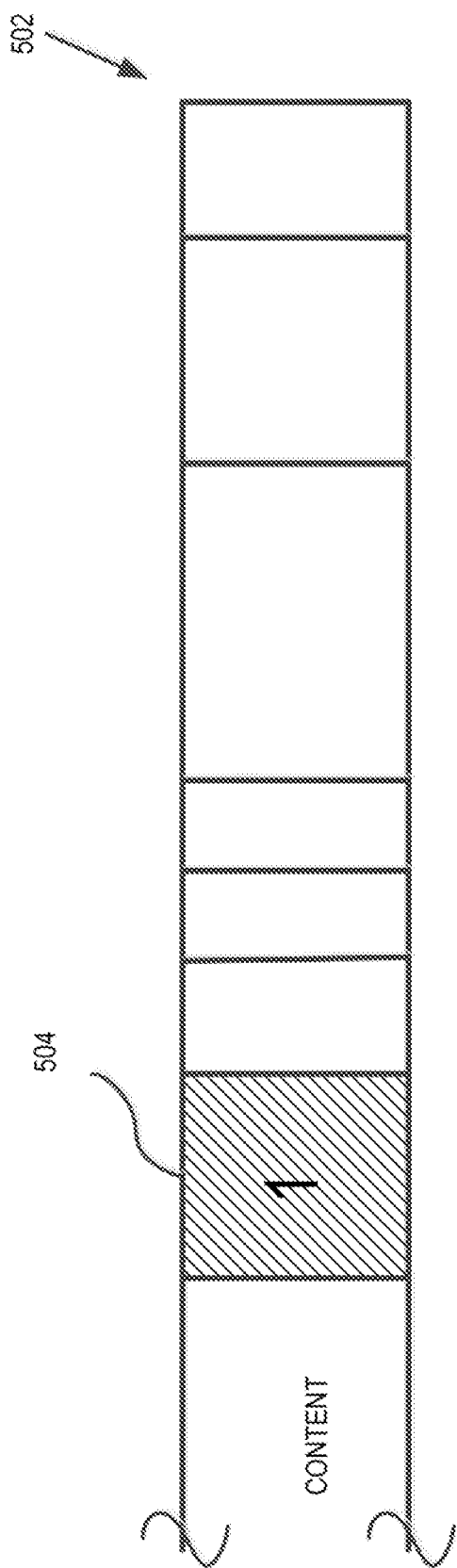
FIG. 5 shows a packet marked with indication to reflect whether the packet is an original or a replicated packet.

FIG. 5 shows a packet 502 marked with indication 504 to reflect whether the packet is an original or a replicated packet. In this example, the value "1" represents an original packet and the value "0) represents a replicated packet. As mentioned, the marking can be done in the header portion or in the content portion of the pocket.

As can be appreciated by the foregoing, embodiments of the invention support SLA maintenance for SLA packets to ensure that packets handled by the NPBs still satisfy SLA requirements if an SLA is involved. Furthermore, embodiments of the invention support traffic management for packets to be forwarded to the monitoring tools such that these packets comply with the capabilities and the requirements of the monitoring tools and/or network. In so doing, NPBs and taps can be truly integrated into the network without causing packets to violate their SLAs, particularly in a high transmission speed scenario. Further, the monitoring tools can be more efficiently utilized when data packet transmission from the NPBs complies with the capabilities and requirements of the monitoring tools and/or network.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in as highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for improving data communication in a network, comprising:
   at a network packet broker residing in a network:
      receiving a plurality of data packets, the plurality of data packets including original data packets transmitted by a first network device and destined for a second network device, the first and second network devices being separate from the network packet broker, the plurality of data packets further including replicate data packets copied by the first network device or a network tap for monitoring purposes;
      segregating the plurality of data packets into the original data packets and the replicate data packets;
      determining whether each of the original data packets is a service level agreement (SLA)-enabled data packet that is associated with a SLA parameter;
      designating the SLA-enabled data packets into a first group comprising a plurality of high priority queues;
      designating the replicate data packets into a second group comprising a plurality of lower priority queues;
      prioritizing the queuing and de-queuing of the plurality of high priority queues in the first group according to SLA parameters associated with the SLA-enabled data packets;
      prioritizing the queuing and de-queuing of the plurality of lower priority queues in the second group according to one or more processing parameters associated with a plurality of monitoring tools; and
      operating as an in-line device for the original data packets by forwarding the original data packets to a first network monitoring tool separate from the first and second network devices, receiving at least some of the original data packets from the first network monitoring tool, and forwarding the original data packets received from the first network monitoring tool to the second network device.

2. The method of claim 1, wherein segregating the plurality of data packets comprises identifying input ports that receive the plurality of data packets.

3. The method of claim 1, wherein segregating the plurality of data packets comprises examining packet header data.

4. The method of claim 1, further comprising marking each data packet with an indication that indicates whether each data packet is an original packet or a replicated packet.

5. The method of claim 4, wherein marking each data packet comprises setting a value in a header field of each data packet.

6. The method of claim 4, wherein marking each data packet comprises adding content to a content portion of each data packet.

7. The method of claim 1, further comprising sending the replicate data packets to a monitoring tool.

8. The method of claim 1, wherein segregating the plurality of data packets is implemented by a tap device.

9. The method of claim 1, wherein segregating the plurality of data packets is implemented by a network packet broker device.

10. The method of claim 1, wherein prioritizing includes queuing the original data packets onto a plurality of different queues.

11. An apparatus for improving data communication in a network, comprising:
    a network packet broker including:
        an ingress port for receiving a plurality of data packets, the plurality of data packets including original data packets transmitted by a first network device and destined for a second network device, the first and second network devices being separate from the network packet broker, the plurality of data packets further including replicate data packets copied by the first network device or a network tap for monitoring purposes;
    a processor; and
        a memory in communication with the processor configured to:
        segregate the plurality of data packets received at the ingress port into the original data packets and the replicate data packets;
        determine whether each of the original data packets is a service level agreement (SLA)-enabled data packet that is associated with a SLA parameter;
        designate the SLA-enabled data packets into a first group comprising a plurality of high priority queues;
        designate the replicate data packets into a second group comprising a plurality of lower priority queues;
        prioritize the queuing and de-queuing of the plurality of high priority queues in the first group according to SLA parameters associated with the SLA-enabled data packets;
        prioritize the queuing and de-queuing of the plurality of lower priority queues in the second group according to one or more processing parameters associated with a plurality of monitoring tools; and
        operate as an in-line device for the original data packets by forwarding the original data packets to a first network monitoring tool separate from the first and second network devices, receiving at least some of the original data packets from the first network monitoring tool, and forwarding the original data packets received from the first network monitoring tool to the second network device.

12. The apparatus of claim 11, wherein the module is configured to segregate the plurality of data packets via identifying input ports that receive the plurality of data packets.

13. The apparatus of claim 11, wherein the module is configured to segregate the plurality of data packets by examining packet header data associated with each of the plurality of data packets.

14. The apparatus of claim 11, wherein the module is configured to mark each data packet with an indication that indicates whether each data packet is an original packet or a replicated packet.

15. The apparatus of claim 14, wherein the module is configured to mark each data packet via setting a value in a header field of each data packet.

16. The apparatus of claim 14, wherein the module is configured to mark each data packet via adding content to a content portion of each data packet.

17. The apparatus of claim 11, wherein the module is configured to send the replicate data packets to a monitoring tool.

18. The apparatus of claim 11, wherein the module is configured to send the original data packets to a monitoring tool.

19. The apparatus of claim 11, wherein the apparatus comprises a network packet broker (NPB) device.

20. A network packet broker (NPB) for facilitating monitoring of network traffic in a data communication in a network, comprising:
    a first port for receiving a plurality of data packets, the plurality of data packets including original data packets transmitted by a first network device and destined for a second network device, the first and second network devices being separate from the network packet broker, the plurality of data packets further including replicate data packets copied by the first network device or a network tap for monitoring purposes; and
    a processor; and
        a memory in communication with the processor configured to:
        segregate the plurality of data packets into the original data packets and the replicate data packets;
        determine whether each of the original data packets is a service level agreement (SLA)-enabled data packet that is associated with a SLA parameter;
        designate the SLA-enabled data packets into a first group comprising a plurality of high priority queues;
        designate the replicate data packets into a second group comprising a plurality of lower priority queues;
        prioritize the queuing and de-queuing of the plurality of high priority queues in the first group according to SLA parameters associated with the SLA-enabled data packets;
        prioritize the queuing and de-queuing of the plurality of lower priority queues in the second group according to one or more processing parameters associated with a plurality of monitoring tools; and
        operating as an in-line device for the original data packets by forwarding the original data packets to a first network monitoring tool separate from the first and second network devices, receiving at least some of the original data packets from the first network monitoring tool, and forwarding the original data packets received from the first network monitoring tool to the second network device.

* * * * *